US011930917B2

(12) United States Patent
Chapman et al.

(10) Patent No.: US 11,930,917 B2
(45) Date of Patent: Mar. 19, 2024

(54) BRUSH DEBRIS REMOVAL APPARATUS

(71) Applicant: Comfortel Furniture Pte. Ltd., Singapore (SG)

(72) Inventors: Jono Chapman, Richmond (AU); Antony Stolfo, Richmond (AU); Lisa Feleppa, Richmond (AU); Sandra Sundelin, Richmond (AU); Matthew Hore, Richmond (AU); Barry Singer, Richmond (AU)

(73) Assignee: Comfortel Furniture Pte. Ltd., Singapore (SG)

( * ) Notice: Subject to any disclaimer, the term of this patent is extended or adjusted under 35 U.S.C. 154(b) by 415 days.

(21) Appl. No.: 16/980,167

(22) PCT Filed: Mar. 14, 2019

(86) PCT No.: PCT/IB2019/052056
§ 371 (c)(1),
(2) Date: Sep. 11, 2020

(87) PCT Pub. No.: WO2019/175813
PCT Pub. Date: Sep. 19, 2019

(65) Prior Publication Data

US 2021/0000249 A1 Jan. 7, 2021

(30) Foreign Application Priority Data

Mar. 14, 2018 (AU) ................................ 2018900836

(51) Int. Cl.
*A46B 17/06* (2006.01)
*A46B 13/02* (2006.01)
(Continued)

(52) U.S. Cl.
CPC .............. *A46B 17/06* (2013.01); *A46B 13/02* (2013.01); *B08B 1/04* (2013.01); *B08B 15/02* (2013.01); *A46B 2200/104* (2013.01)

(58) Field of Classification Search
CPC ........ A45D 24/46; A46B 13/02; A46B 17/06; A46B 2200/104; A47L 7/0057;
(Continued)

(56) References Cited

U.S. PATENT DOCUMENTS 1,542,025 A 6/1925 Ballman
2,524,214 A 10/1950 Webster et al.
(Continued)

FOREIGN PATENT DOCUMENTS

CN 107413706 A * 12/2017 ............... B08B 1/04
DE 102009005883 B4 * 4/2014 ............. A45D 24/46
(Continued)

OTHER PUBLICATIONS

English Translation of CN 107413706 A (Year: 2017).*
(Continued)

*Primary Examiner* — Michael D Jennings
(74) *Attorney, Agent, or Firm* — Stoel Rives LLP

(57) ABSTRACT

An apparatus for removal of debris from a debris-carrying brush comprising a housing having a brush aperture and an exhaust aperture, a debris-removal component having an array of cleaning elements, and a passive debris collection means, wherein, in a substantially dry environment free of water and cleaning solutions, the debris-removal component rotates such that the array of cleaning elements remove debris from a debris-carrying brush inserted into the apparatus through the brush aperture and brought in contact therewith, rotation of the debris-removal component causes the array of cleaning elements to induce an airflow towards the passive debris collection means, the airflow captures and
(Continued)

entrains at least a portion of removed debris, and the entrained debris is deposited in the passive debris collection means.

7 Claims, 4 Drawing Sheets

(51) Int. Cl.
*B08B 1/04* (2006.01)
*B08B 15/02* (2006.01)

(58) Field of Classification Search
CPC ......... B08B 1/002; B08B 1/005; B08B 1/006; B08B 1/04; B08B 5/00; B08B 15/02; B08B 2215/00
USPC .................................... 15/303, 308, 38, 88.2
See application file for complete search history.

(56) References Cited

U.S. PATENT DOCUMENTS

| | | | | | |
|---|---|---|---|---|---|
| 3,058,134 | A | | 10/1962 | Wozniak-Rennek | |
| 3,217,349 | A | * | 11/1965 | Dell | A46B 17/06 15/311 |
| 3,225,377 | A | | 12/1965 | Winter et al. | |
| 3,316,577 | A | * | 5/1967 | Kravos | A46B 15/0053 15/375 |
| 3,348,253 | A | | 10/1967 | McCoy | |
| 3,805,318 | A | | 4/1974 | Marquette | |
| 4,084,282 | A | * | 4/1978 | Calvert | A46B 17/06 15/23 |
| 5,363,870 | A | | 11/1994 | Doyon | |
| 6,115,866 | A | * | 9/2000 | Trummer | A46B 13/001 15/23 |
| 6,981,292 | B1 | * | 1/2006 | Dassi | A45D 24/46 15/39 |
| 7,296,319 | B2 | | 11/2007 | Brackett et al. | |
| 8,185,944 | B2 | | 5/2012 | Brackett et al. | |
| 8,910,337 | B2 | | 12/2014 | Brackett et al. | |
| 9,380,860 | B1 | | 7/2016 | Taylor | |
| 2009/0038096 | A1 | * | 2/2009 | Hollander | A47L 23/263 15/161 |

FOREIGN PATENT DOCUMENTS

| | | | |
|---|---|---|---|
| ES | 2163959 | | 2/2002 |
| JP | 2002346491 | | 12/2002 |
| NL | 9300585 | | 11/1994 |
| WO | 2014084569 | A1 | 6/2014 |

OTHER PUBLICATIONS

English Translation of DE 102009005883 A1 (Year: 2014).*
International Search Report and Written Opinion dated Jun. 24, 2019 for international application PCT/IB2019/052056.

* cited by examiner

BRUSH DEBRIS REMOVAL APPARATUS

PRIORITY APPLICATION

The present application is a national stage filing under 35 U.S.C. § 371 of International Patent Application No. PCT/IB2019/052056, filed Mar. 14, 2019, which claims priority from Australian provisional application 2018900836, filed on Mar. 14, 2018, the entirety of each of which is incorporated herein by reference.

FIELD OF THE INVENTION

The present invention relates to the field of cleaning haircare implements, and more particularly to the field of cleaning brushes of trapped debris and other contaminants.

BACKGROUND

Within the hairdressing and beauty industry it is necessary—both for client satisfaction and for hygiene—to clean hairbrushes between uses using a two-step process. The first step comprises removal of hair, dust and other debris from the brush bristles, known as the 'debris removal' step. The second step comprises washing the brushes, ideally with hot soapy water or similar cleaning solutions, in the 'cleaning and disinfecting' step. The brush, once dried, is then ready for use on a further client. However, the rapid and efficient cleaning of hairbrushes poses a number of problems. For example, hair salons use styling brushes with regularity, the bristles of which become quickly clogged with a client's hair and scalp debris. This makes the first 'debris removal' step of the cleaning process difficult and time-consuming.

Other industries utilise brushes of various forms as well. Although these brushes may not be in contact with people and may therefore not require disinfection, it is still necessary to remove debris trapped with brush bristles of—for example—vacuum cleaner rollers, cleaning brushes, wire brushes and dust brushes that may be employed on machinery in various industrial facilities.

While existing technologies have sought to provide mechanisms of cleaning brush implements, there is currently no easy method for removal of debris from brushes while allowing for easy collection and disposal of debris. Resultantly, current mechanisms of cleaning brushes and collecting the waste may include manually combing through cleaning bristles to remove hair or using a prior art apparatus to clean the hairbrush.

The majority of existing brush cleaning technologies use liquid or aqueous solutions to clean hairbrushes, with certain examples attempting to combine the first and second brush-cleaning steps in order to improve efficiency. This however poses its own problems, as wet debris may be prone to 'clumping' or aggregating around the bristles, particularly if—in the case of hair brushes—a form of hair product was previously used on the hair. As a result the combined cleaning technologies tend to make the overall cleaning process more difficult as well as less successful in removal of debris.

Dry-operating systems are known. However, these often require large, cumbersome and power-hungry vacuum or suction attachments in order to collect hairbrush debris. These devices are also frequently noisy, large or require a permanent power supply which can limit their ability to be most effectively used in a salon.

It is therefore an object of the present invention to seek to ameliorate or eliminate the problems inherent in the prior art, and provide a more hygienic, rapid and efficient solution for removal of debris from a brush, thereby enabling the rapid completion of the cleaning process.

DISCLOSURE OF THE INVENTION

The present invention comprises, in a broad first aspect, an apparatus for removal of debris from a debris-carrying brush comprising a housing having a brush aperture and an exhaust aperture, a debris-removal component having an array of cleaning elements, and a passive debris collection means, wherein, in a substantially dry environment free of water and cleaning solutions, the debris-removal component rotates such that the array of cleaning elements remove debris from a debris-carrying brush inserted into the apparatus through the brush aperture and brought in contact therewith, rotation of the debris-removal component causes the array of cleaning elements to induce an airflow towards the passive debris collection means, the airflow captures and entrains at least a portion of removed debris, and the entrained debris is deposited in the passive debris collection means. In an embodiment, the passive debris collection means further comprises a baffle arranged to be in the path of the induced airflow.

In an embodiment, the cleaning elements comprise one or more of bristles, teeth, tendrils, scrubbers, wipers and scrapers.

In an embodiment, the apparatus further comprises a sensor configured to selectively activate rotation of the debris-removal component upon insertion of a brush, and to deactivate rotation of the debris-removal component upon removal of the brush.

In an embodiment, the debris-removal component further comprises a body from which the array of cleaning elements extend, and a channel formed within a surface of the body and extending between any two of the array of cleaning elements, wherein the channel is configured to allow a cutting implement to pass therealong so as to sever any fibrous debris that is trapped within the array of cleaning elements and/or wrapped around the body.

In an embodiment, the housing further comprises a means to prevent entrained debris from exiting the apparatus through the exhaust aperture.

In an embodiment, the passive debris collection means comprises a removable receptacle for capturing debris deposited therein.

DESCRIPTION OF FIGURES

In order that the present invention be better understood and put into practice, reference will now be made to the accompanying drawings wherein.

DEFINITIONS

In the context of the present specification, 'brush' should be understood to not be limited to a hairbrush, but to any brush that may be used and may subsequently contain and/or entrap debris.

In the context of the present specification, 'debris' should be understood to refer to any light, unwanted material trapped, deposited or otherwise held within the bristles of a brush. This includes, but is not limited to, hairs, haircare products such as dried shampoo or hairspray, skin flakes, dirt, dust, grime and/or grease, or any other contaminant that may be transferred onto a brush during use thereof.

DETAILED DESCRIPTION OF PREFERRED EMBODIMENT

Figure 1:
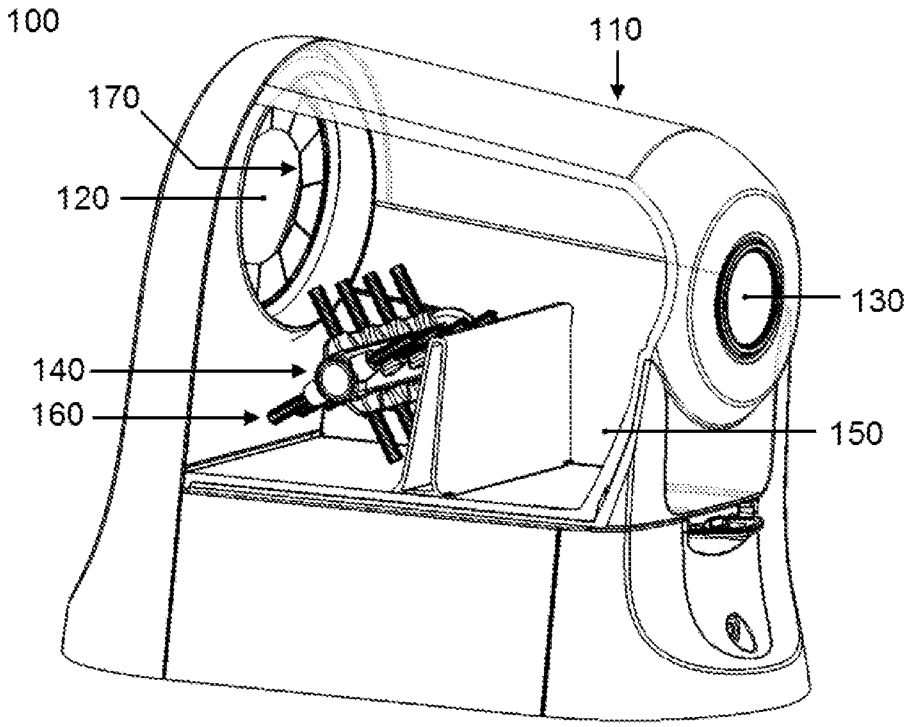
FIG. 1 depicts a cutaway view of an embodiment of the present invention.

With reference to FIG. 1, in one aspect the present invention is an apparatus 100 comprising a housing 110 having a brush aperture 120 and an exhaust aperture 130, at least one rotating debris-removal component 140 and at least one passive debris collection means 150. The debris-removal component 140 comprises an array of cleaning elements 160. In use, the debris-removal component 140 rotates about an axis, and a debris-carrying brush (not shown) is brought into contact with the moving cleaning elements 160. The cleaning elements 160 act to remove debris from the brush. In an embodiment, the brush aperture 120 may further comprise aperture skirt 170, being an array of flexible skirt flaps lining the inner perimeter of the brush aperture 120 that act to enable a brush to be inserted and/or removed, but at least partially inhibit the backflow of lighter particulate matter such as debris out through the brush aperture 120.

Figure 2:
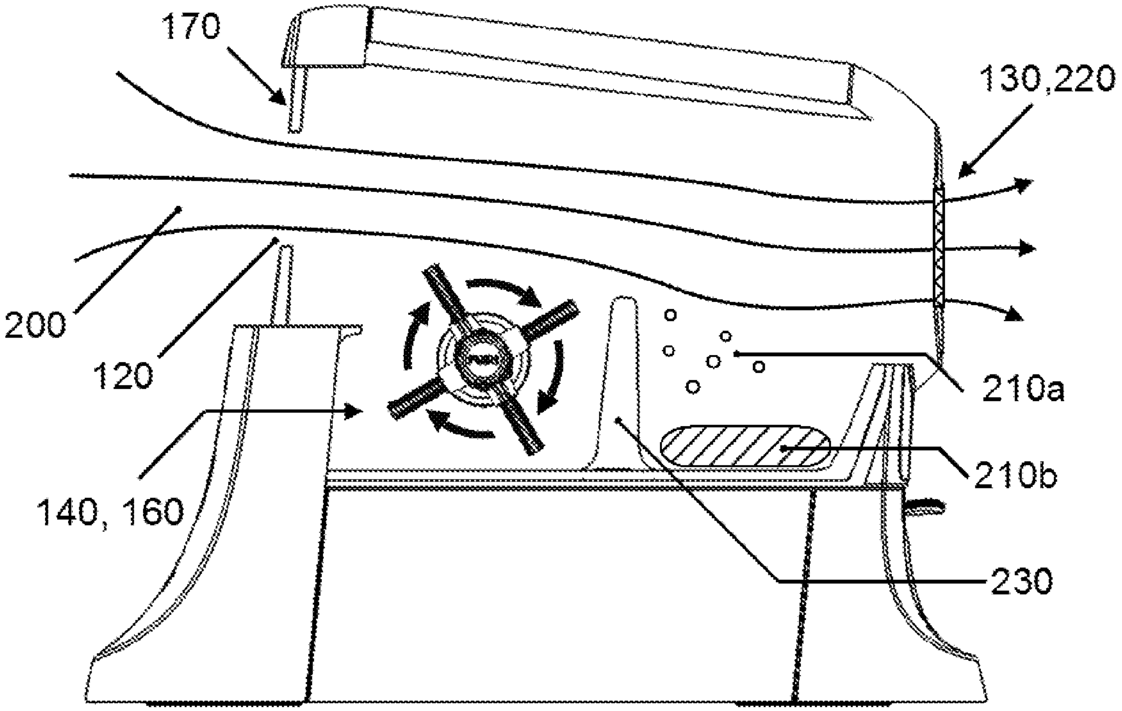
FIG. 2 depicts a cutaway side view of the embodiment shown in FIG. 1, illustrating an airflow path through the apparatus.

In an embodiment and with reference to FIG. 2, the cleaning elements 160 are configured such that, upon rotation of the debris-removal component 140, the movement of the cleaning elements 160 induces or generates an airflow 200 that is generally directed towards the passive debris collection means 150. Without limiting the scope of the invention through theory, it is understood that rotation of the debris-removal component 140 and subsequent movement of the cleaning elements 160 causes air to be drawn in through the brush aperture 120 and pushed towards the exhaust aperture 130. It is further understood that, in at least the present embodiment, the induced or generated flowing air 200 may serve as a carrier for dislodged and/or removed debris. This may enable transport of removed debris from the brush towards the debris collection means 150, whereupon substantially all of the debris is released from the flowing air 200 and captured therein. This is depicted by released debris 210*a* and debris pile 210*b*. The flowing air then exits from the apparatus 100 by passing through the exhaust aperture 130. In a further embodiment, the exhaust aperture 130 may comprise a retention means 220 to prevent entrained debris from exiting the apparatus 100 through the exhaust aperture 130, such as a mesh, a grid or other means of restricting the movement of solids without overly inhibiting the flow of moving air. In a further embodiment, the apparatus 100 may comprise multiple rotating debris-removal components 140 that may act to provide increased airflow generation.

It is understood that, in at least the present embodiment of the invention, the rotation of the debris-removal component 140, and subsequent circular movement of the cleaning elements 160, generates sufficient airflow 200 to capture a majority of the dislodged and/or removed debris. Even in adapting the apparatus 100 of the present invention for larger brushes, it is believed that utilising additional rotating debris-removal components 140 may provide sufficient airflow 200, and that embodiments of the present invention do not require an additional source of air flow generation such as a vacuum means or fan.

The generation of a positive air flow in the form of the induced air stream may offer a significant advantage over prior art brush debris-removal devices that use suction or vacuum means. Vacuum means typically require very high levels of power, as well as sophisticated filtration means to prevent blockage of the vacuum source. Vacuum means also require external machinery in order to generate the negative pressure that forms the vacuum. In contrast, the present invention provides a means that uses very little extra power and no extra machinery in order to induce an airflow 200 that captures, entrains and deposits debris in a debris collection means 150.

The apparatus 100 of the present invention may offer similar advantages over prior art brush cleaning apparati that utilise a separate airflow generator instead of a vacuum means. Airflow generators require additional power, as well as at least one pump or fan in order to generate the air flow. This imposes additional structural requirements upon the prior art apparatus 100 as well as increasing the complexity of construction and maintenance. In contrast, embodiments of the present invention require no additional power beyond operation of the rotating debris-removal component 140, and does not suffer from increased complexity in construction and maintenance to account for additional moving parts.

As the skilled person may appreciate, brush cleaning (specifically hairbrush cleaning) is a two-step process, the first step being removal of debris and the second step being cleaning with solution and/or disinfectant. The present invention is further configured to operate in a substantially dry environment, without the need or use of water, cleaning solutions or other chemicals for at least the step of removing debris from the brush. This is considered advantageous over the prior art methods that utilise water or a cleaning solution during the debris-removal step, in that cleaning and removal of deposited debris from the collection means is simplified. In prior art systems wherein water or a cleaning solution is used in the debris-removal step, the skilled person may appreciate that debris typically trapped within a person's hair (and subsequently within a brush used to brush said hair) may, upon contact with water, form oily films, sticky mats or gels or otherwise unpleasant, slimy residue that would need to be removed from the prior art apparatus 100.

If debris-removal is the only cleaning step conducted with regularity (and a second 'wet' cleaning step is conducted more infrequently), then the present invention offers the additional advantage of not requiring substantial drying except for when a second 'wet' cleaning step is carried out. Alternatively, in situations wherein 'wet' cleaning (e.g. the use of cleaning solution, disinfectant or hot soapy water) is regularly performed, removal of the majority of debris prior to immersion in solution will prevent the cleaning solution or other liquid from becoming rapidly contaminated.

Without limiting the scope of the invention, it is understood that debris may be at least partially released from the flowing air as the flowing air disperses. Heavier forms of debris such as hair or congealed dust and/or oils may naturally exit in suspension within the flowing air. However, it is understood that lighter forms of debris such as dust may be borne upon moving air for a substantial distance. Therefore, in at least one embodiment of the invention, the passive debris collection means 150 may further comprise a baffle 230 arranged to be within, or at least along, the path of the induced airflow. In an embodiment, the baffle 230 is positioned, shaped, arranged or otherwise adapted to assist in inducing the air stream to release carried debris. This may be through inducing a pressure differential to provide a path for debris to escape. Alternatively, this may be through providing an edge, curve, point, corner or otherwise surface adapted to induce drag within the air stream, thereby encouraging the release of entrained or carried debris. Alternatively, the release of the captured debris may be through the baffle 230 inducing a disruption in the flowing air. In some embodiments, the baffle 230 may be integral with the housing 110. In other embodiments, the baffle 230 may be a separate element and may further be removable.

Figure 3A:
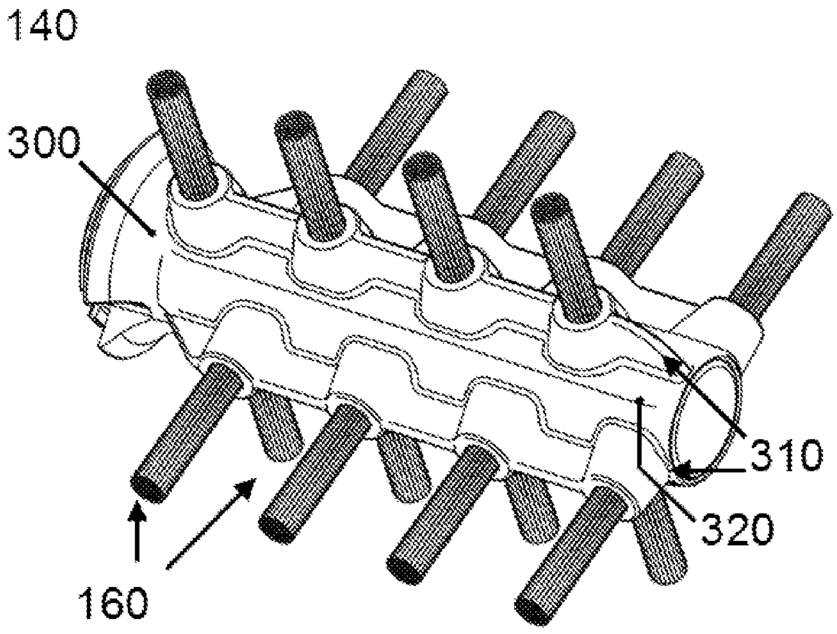
FIGS. 3A & 3B depict two embodiments of a debris-removal component of the present invention.
Figure 3B:
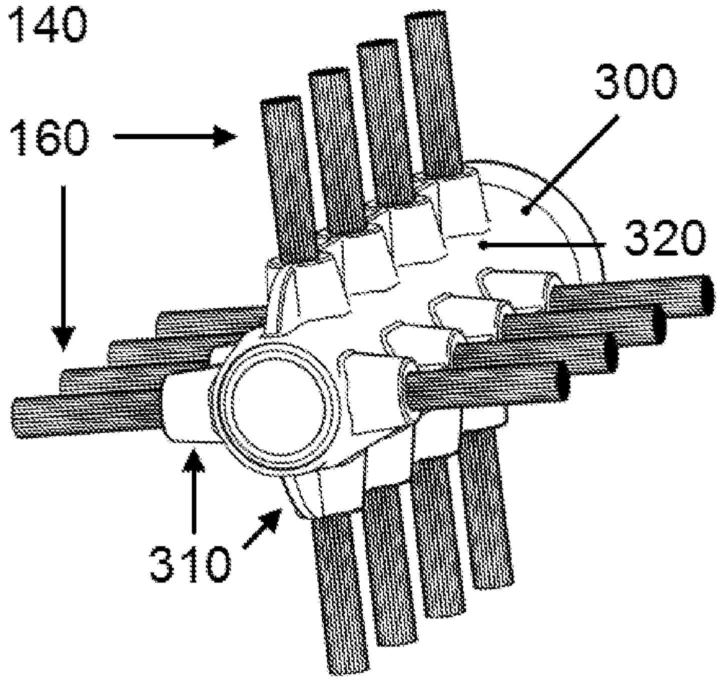

With reference to FIGS. 3A & 3B and in an embodiment of the present invention, the debris-removal component 140 may comprise or substantially comprise a body 300 that rotates about its axis. As depicted in FIGS. 3A & 3B, the cleaning elements 160 may radiate outwards from the body 300 from a series of protrusions 310 on the surface of the body 300. In an alternate embodiment (not shown), the cleaning elements 160 may directly extend outwards from the body 300

Although the array of cleaning elements 160 are depicted as radiating essentially perpendicularly outwards from the body 300 of the debris-removal component 140, the skilled person will appreciate that the cleaning elements 160 may radiate outwards at an angle away from perpendicular without departing from the scope or object of the invention, provided that the arrangement of cleaning elements 160 is still able to induce or generate an air flow.

In an embodiment of the present invention, the cleaning elements 160 may comprise one or more of bristles, teeth, tendrils, scrubbers, wipers or scrapers. The embodiment shown in the figures comprises a rotating debris-removal component 140 with a plurality of cleaning elements 160 comprising bristles, although it should be understood that this is for illustrative purposes only and that the cleaning elements 160 may comprise other forms. In some embodiments of the present invention, the cleaning elements 160 may be rigid. In alternate embodiments, the cleaning elements 160 may be flexible, and may be springy, resiliently flexible or have limited springiness. As shown in FIG. 1, the array of cleaning elements 160 may be arranged in a plurality of rows extending along a length of the debris-removal component 140. However, as the skilled person will appreciate, the depiction of the arrangement of cleaning elements 160 in the figures is exemplary only. In an alternative embodiment the cleaning elements 160 may be arranged in coils, circles, spirals, scattered or any other pattern without departing from the scope or object of the invention, provided that the arrangement is still capable of generating or inducing an air flow 200 as depicted in FIG. 2.

As the skilled person will appreciate, fibrous debris that is pulled or otherwise removed from a brush by the debris-removal component 140 may become wrapped around the debris-removal component 140 or trapped within the cleaning elements 160. In an embodiment of the present invention and with reference to FIGS. 3A & 3B, a channel 320 may be formed between two adjacent protrusions 310. In an alternative embodiment, the channel 320 may be formed within a surface of the body 300 and extend between any two of the array of cleaning elements 160. In either embodiment, the channel 320 may be shaped to enable a cutting implement, such as a razor, knife or scissors, to traverse the channel 320 and sever fibrous debris that has become trapped within the array of cleaning elements 160 and/or wrapped around the body 300.

Figure 4:
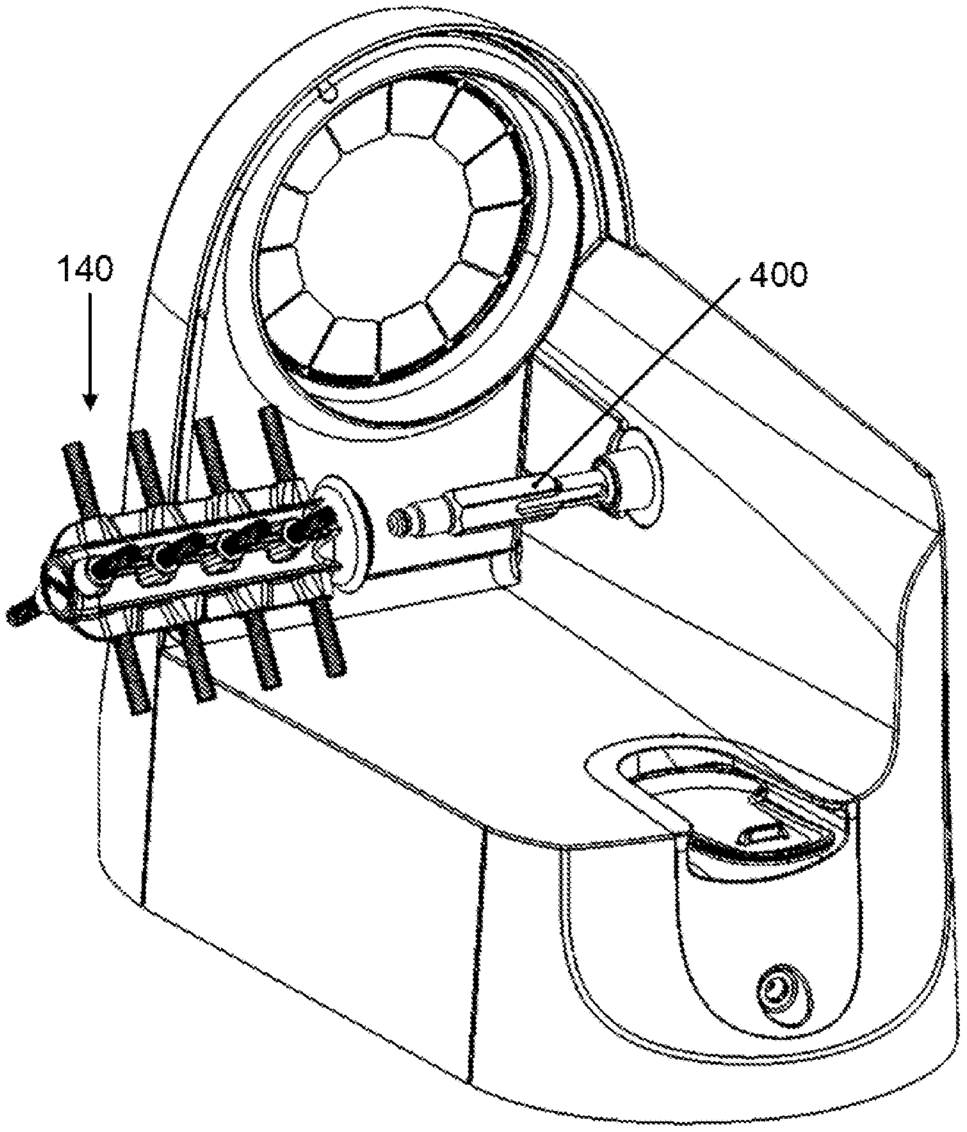
FIG. 4 depicts a removable debris-removal component.

With reference to FIG. 4, in at least one embodiment of the present invention the apparatus 100 may further comprise an axle 400 to which the debris-removal component 140 may be removably mounted. The debris-removal component 140 being removable may facilitate cleaning of the debris-removal component 140 and/or the cleaning elements 160 extending therefrom, or may facilitate replacement of the debris-removal component 140.

As depicted in the figures, in an embodiment of the present invention, the debris collection means 150 may comprise a debris collection receptacle within the housing 110 of the apparatus 100 that is shaped or otherwise configured to capture debris. In an embodiment of the invention wherein the apparatus 100 comprises a baffle 230, the baffle 230 may form a wall, or portion thereof, of the debris collection receptacle.

In a further embodiment, the debris collection means 150 may further comprise at least one flow-back prevention means adapted to inhibit, prevent or at least limit collected debris from exiting the debris collection means 150 back into the cleaning region of the housing 110. In at least one embodiment and as depicted in the figures, the baffle 230 that assists in releasing debris from the flowing air may be arranged to also form the flowback prevention means. In an alternate embodiment (not shown), the flowback prevention means may be a separate or additional internal structure.

Figure 5:
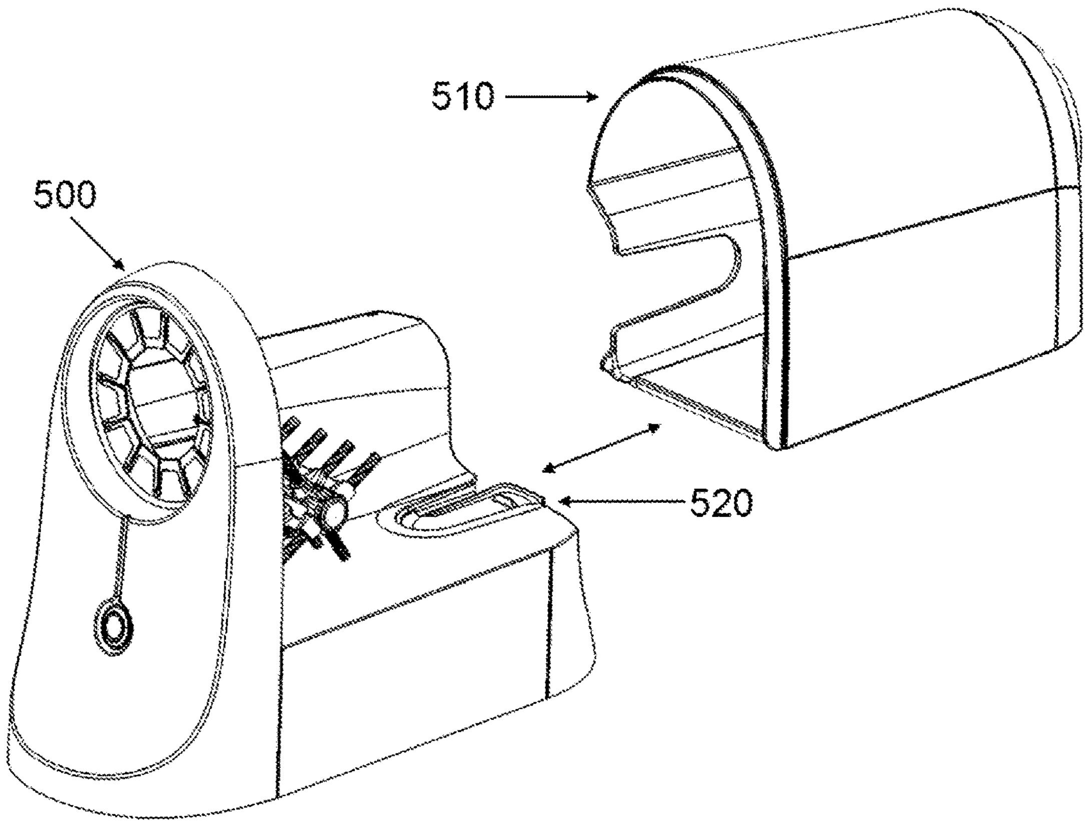
FIG. 5 depicts an embodiment of the invention wherein the debris collection receptacle is removable.

With reference to FIG. 5 and in a further embodiment of the present invention, the apparatus 100 may comprise a base unit 500 that comprises at least the brush aperture 120 and debris-removal component 140, and a removable case 510 containing the debris collection receptacle. The base unit 500 may also comprise a case catch 520, actuation of which releases the removable case 510 and enables its removal. In the embodiment shown in FIG. 5, the exhaust aperture 130 is also incorporated into the removable case 510, however the skilled person will appreciate that the base unit 500 could be shaped to comprise the exhaust aperture 130 without departing from the scope or object of the invention.

In an alternative embodiment of the present invention, the debris collection means 150 may comprise an outlet through which debris, upon being released from the air stream, may substantially exit from the brush debris-removal device. In a further embodiment, the outlet may connect to a hose, pipe or further receptacle for collection of debris.

Figure 6:
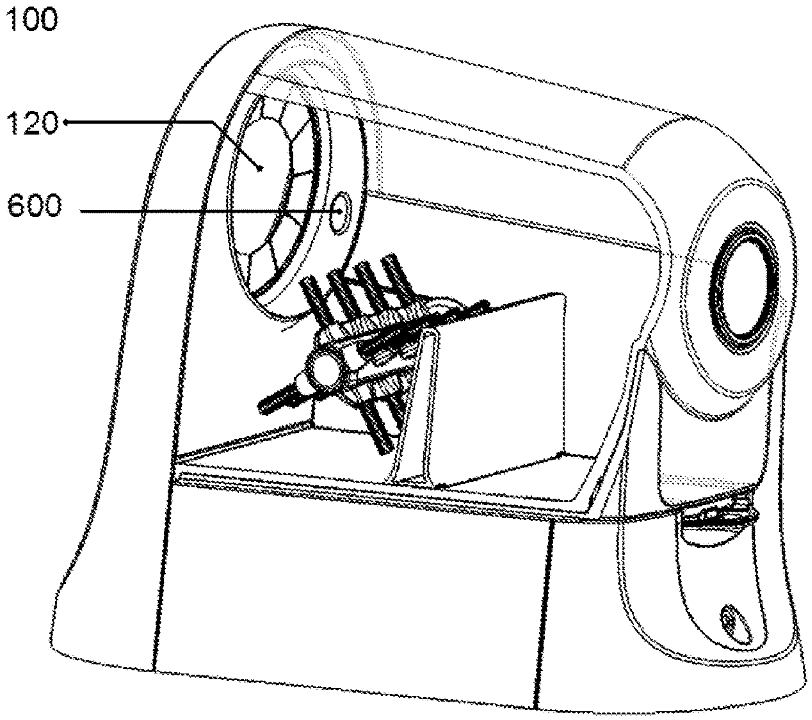
FIG. 6 depicts a further embodiment of the present invention comprising a sensor.

In an embodiment of the present invention, the apparatus 100 may further comprise at least one sensor 600. The sensor 600 may be adapted to activate rotation of the debris-removal component 140 upon detecting that a brush is inserted into the brush aperture 120. The sensor 600 may be adapted to deactivate the debris-removal component 140 upon detecting that the brush is removed from the brush aperture 120. In a further embodiment, the sensor 600 may be configured to both activate the debris-removal component 140 upon insertion of a brush and deactivate it upon removal thereof. FIG. 6 depicts the sensor 600 as being proximal to the brush aperture 120, however the skilled person will appreciate this this location is exemplary only and the sensor 600 may be located elsewhere within the apparatus 100 provided it can still sense the insertion and/or removal of a brush.

Although uses in a hairdressing or beauty salon environment are exemplified, this should in no way be interpreted as limiting upon the function of the invention. Embodiments of the invention may be adapted for use in multiple industries for cleaning of brushes. By way of non-limiting example, the present invention is considered to be highly suitable for cleaning of roller brushes as present within vacuum cleaners, as well as many other forms of brush that may trap debris and require cleaning.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Any promises made in the present document should be understood to relate to some embodiments of the invention, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

The invention claimed is:

1. An apparatus for removal of debris from a debris-carrying hairbrush, the apparatus comprising:

a housing defining an internal cavity sized to receive a portion of the hairbrush therewithin, the housing having a brush aperture and an exhaust aperture that each open into the internal cavity from substantively opposing ends thereof and are substantially aligned with one another;

a rotatable debris-removal component positioned entirely within the internal cavity, the rotatable debris-removal component having an array of cleaning elements configured to remove debris from the hairbrush; and a passive debris collection means defined at an end proximal to the debris-removal component by a baffle extending into the internal cavity;

wherein, in a substantially dry environment free of water and cleaning solutions:

rotation of the debris-removal component drives the array of cleaning elements to move in a circular path comprised of a first arc direction being aligned substantively from the brush aperture towards the exhaust aperture and a second arc direction being aligned substantively from the exhaust aperture and towards the brush aperture, enabling the moving array of cleaning elements to remove debris from a portion of the hairbrush in contact therewith;

movement of the array of cleaning elements in the first arc direction draws air through the brush aperture and induces an airflow within the internal cavity along an airflow path that passes through the brush aperture, traverses over the baffle and the passive debris collection means, and subsequently exits the internal cavity through the exhaust aperture;

the brush aperture is sized such that the portion of the hairbrush is able to be inserted therethrough and brought into contact with the array of cleaning elements at a location that is entirely within the internal cavity and in the airflow path;

the airflow captures and entrains at least a portion of debris removed from the hairbrush by the array of cleaning elements;

the baffle is arranged substantially perpendicular to a proximal portion of a path of the airflow that extends between the substantially aligned brush aperture and exhaust apertures, so as to contort a portion of the airflow path, such that the portion of the debris that is captured and entrained by the air of the airflow is induced to exit the airflow and be deposited in the passive debris collection means; and the passive debris collection means is configured to be substantially out of the airflow path.

2. The apparatus of claim 1 wherein the cleaning elements are one or more elements selected from the group consisting of bristles, teeth, tendrils, scrubbers, wipers and scrapers.

3. The apparatus of claim 1 further comprising a sensor configured to selectively activate rotation of the debris-removal component upon insertion of the brush, and to deactivate rotation of the debris-removal component upon removal of the brush.

4. The apparatus of claim 1 wherein the debris-removal component further comprises a body from which the array of cleaning elements extend; and a channel formed within a surface of the body and extending between any two cleaning elements of the array of cleaning elements;

wherein the channel is configured to allow a cutting implement to pass therealong so as to sever any fibrous debris that is trapped within the array of cleaning elements and/or wrapped around the body.

5. The apparatus of claim 1 wherein the housing further comprises a means to prevent entrained debris from exiting the apparatus through the exhaust aperture.

6. The apparatus of claim 1 wherein the passive debris collection means comprises a removable receptacle for capturing debris deposited therein.

7. The apparatus of claim 1, wherein the baffle is arranged to inhibit inducement of a reverse airflow in a direction opposite the airflow path by the array of cleaning elements moving in the second arc direction.

* * * * *